US 6,565,726 B2

(12) United States Patent
Sato

(10) Patent No.: US 6,565,726 B2
(45) Date of Patent: May 20, 2003

(54) ELECTRODEIONIZATION APPARATUS AND METHOD OF OPERATING THE SAME

(75) Inventor: Shin Sato, Tokyo (JP)

(73) Assignee: Kurita Water Industries, LTD, Tokyo (JP)

( * ) Notice: Subject to any disclaimer, the term of this patent is extended or adjusted under 35 U.S.C. 154(b) by 0 days.

(21) Appl. No.: 09/904,172

(22) Filed: Jul. 12, 2001

(65) Prior Publication Data
US 2002/0020626 A1 Feb. 21, 2002

(30) Foreign Application Priority Data
Jul. 13, 2000 (JP) ........................................ 2000-213078
Jul. 9, 2001 (JP) ........................................ 2001-207422

(51) Int. Cl.[7] .............................................. B01D 61/44
(52) U.S. Cl. ........................ 204/524; 204/533; 204/632; 204/634
(58) Field of Search ................................ 204/524, 533, 204/632, 634

(56) References Cited

U.S. PATENT DOCUMENTS
6,379,518 B1 * 4/2002 Osawa et al. ............... 204/524

* cited by examiner

Primary Examiner—Arun S. Phasge
(74) Attorney, Agent, or Firm—Darby & Darby

(57) ABSTRACT

Feed water, fed through an inlet 6 into a desalting compartment 8, flows around the end 4a of a anion-exchange membrane 4 surrounding an anode 2a. The feed water enters into a portion defined between the anion-exchange membrane 4 and a cation-exchange membrane 5, and flows around the end 5a of the cation-exchange membrane 5 surrounding a cathode 3a. Then, the water to be treated further flows around the ends 4b, 5b of ion-exchange membranes 4, 5 surrounding an anode 2b and a cathode 3b, respectively, and then flows out through a product water outlet 7. A part of product water is supplied to the concentrated water circulating within the concentrating compartment 30, 40. A part of the concentrated water flowing out of the concentrating compartment 30, 40 is added to concentrated water circulating within the concentrating compartment 10, 20. The diffusion of silica from the concentrating compartment is restricted. As a result, final product water containing extremely low silica concentration is obtained.

22 Claims, 5 Drawing Sheets

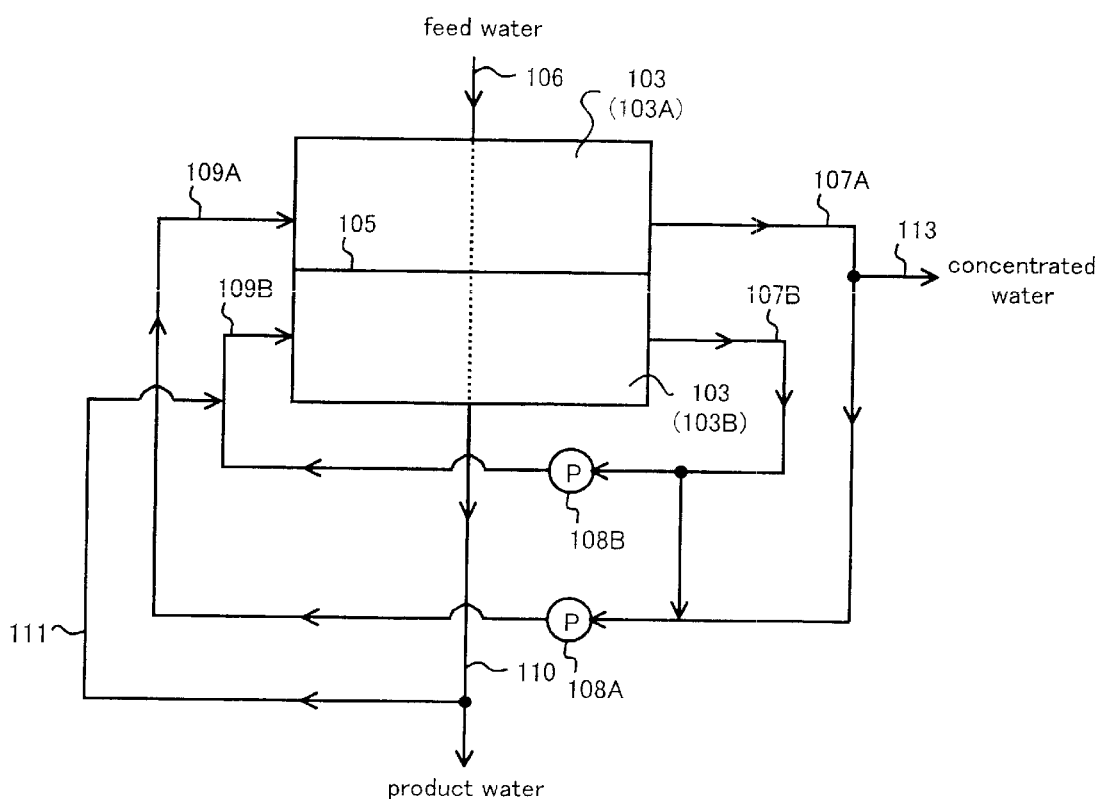

ELECTRODEIONIZATION APPARATUS AND METHOD OF OPERATING THE SAME

FIELD OF THE INVENTION

The present invention relates to an electrodeionization apparatus for electrically separating ions from water and a method of operating the same.

BACKGROUND OF THE INVENTION

Electrodeionization apparatuses have been used in the field of pure water and ultra pure water production. A plate and frame type electrodeionization apparatus includes an anode, a cathode, anion-exchange membranes and cation-exchange membranes. The membranes are arranged alternately in such a manner as to alternately form concentrating compartments and desalting compartments (dilution compartments) between the anode and the cathode. The desalting compartments are filled with an ion exchanger such as an ion exchange resin. Raw water, which is to be treated, is introduced into the desalting compartments of the electrodeionization apparatus. Ions contained in the water permeate through the ion exchange membranes into the concentrating compartments.

Japanese patent publication S56-16688B discloses an electrodeionization apparatus comprising a cylindrical casing, electrodes (anodes and cathodes) having a shape of a rod and being arranged parallel with each other, and cylindrical ion-exchange membranes surrounding the respective electrodes. Each ion-exchange membrane defines a concentrating compartment surrounding the electrode so that deionized water flows outside of the respective ion-exchange membranes.

In this conventional electrodeionization apparatus, concentrated water from the concentrating compartments surrounding the anodes and concentrated water from the concentrating compartments surrounding the cathodes are mixed and circulated to the respective concentrating compartments.

According to such a conventional electrodeionization apparatus, it is difficult to remove silica at a high removal rate due to diffusion of silica from the concentrating compartments. For instance, when the electrodeionization apparatus is operated under conditions in which the feed water contains a silica concentration of 200 parts per billion (ppb) and the overall product water recovery from the apparatus is 90%, water flowing the concentrating compartments contains a high silica concentration about 2000 ppb. As a result, the silica diffuses from the concentrating compartments to the desalting compartments at a high rate, thus, the silica concentration in the product water flowing out of the apparatus fails to become sufficiently low.

OBJECTS AND SUMMARY OF THE INVENTION

It is an object of the present invention to provide an electrodeionization apparatus and method which overcomes the foregoing problems.

It is a further object of the present invention to provide an electrodeionization apparatus which restrains the diffusion of silica from the concentrating compartments, producing product water with an extremely low silica concentration.

The method of the present invention employs an electrodeionization apparatus which has at least one anode, at least one cathode, and ion-exchange membranes which are arranged to form at least one concentrating compartment and at least one desalting compartment between the anode and the cathode. Concentrated water flows into the concentrating compartment, feed water flows into the desalting compartment, and the product water flows out of the desalting compartment. The silica concentration of the concentrated water flowing out of the concentrating compartment is less than 1000 times as great as that of the product water.

In order to produce the product water containing silica at a concentration of 0.1 ppb or less, the concentrated water flowing out of the concentrating compartment contains the silica preferably at a concentration of less than 100 ppb, more preferably less than 70 ppb.

In an aspect of the invention, the electrodeionization apparatus has a plurality of concentrating compartments along the flow direction of water in the desalting compartment, and the concentrated water flowing out of the concentrating compartment which is located at the most downstream side in regard to the desalting compartment has the silica concentration less than 1000 times as great as that of the product water. According to this aspect of the present invention, the gradient of silica concentration from the concentrating compartment to the desalting compartment is small even near the outlet of the concentrating compartment, so that silica is restricted to diffuse from the concentrating compartment to the desalting compartment, and the product water contains silica at an extremely low concentration.

In another aspect of the invention, the number of the concentrating compartments is n (n is an integer of 2 or more), i.e. first through n-th concentrating compartments are provided along the flow direction of water in the desalting compartment, a part of concentrated water flowing out of the first concentrating compartment is discharged and the remainder of the concentrated water is circulated into the first concentrating compartment, a part of concentrated water flowing out the k-th ($2 \leq k \leq n$) concentrating compartment is supplied to the (k−1)-th compartment just ahead of the k-th compartment and the remainder of the concentrated water is circulated into the k-th concentrating compartment, and a part of the product water is supplied to the n-th concentrating compartment which is located at the most downstream side in regard to the desalting compartment. According to this aspect of the present invention, the silica concentration is reduced sufficiently in the concentrated water in the concentrating compartment nearest the outlet and in the product water.

In the present invention, water to be added to the concentrating compartment can be supplied to a feed line connected to the concentrating compartment. Instead thereof, the water can be supplied directly to the concentrating compartment.

The electrodeionization apparatus according to an aspect of the present invention has an anode, a cathode, and ion-exchange membranes so that a concentrating compartment and a desalting compartment are defined by the ion-exchange membranes relative to the anode and the cathode. The concentrated water flows through the concentrating compartments, the feed water flows into the desalting compartment and the product water is taken out of the desalting compartment. The electrodeionization apparatus has first through n-th concentrating compartments from the most upstream side to the most downstream side in regard to the desalting compartment.

According to an aspect of the invention, the electrodeionization apparatus has a supplier which supplies a part of the product water to the n-th concentrating compartment. The product water may be fed to the concentrating compartment directly or to a line for feeding the concentrated water to the n-th concentrating compartment.

The electrodeionization apparatus may have a flow line or lines which discharges a part of concentrated water flowing out of the first concentrating compartment, circulates the remainder thereof into the first concentrating compartment, supplies a part of the concentrated water flowing out of the k-th ($2 \leq k \leq n$) concentrating compartment to the (k−1)-th concentrating compartment, and circulates the remainder of thereof into the k-th concentrating compartment.

Each desalting compartment may be packed with an ion exchanger such as ion exchange resin or ion exchange fiber. The concentrating compartment may be packed with an ion exchanger or activated carbon. The number "n" is preferably 2 to 10, more preferably 2 to 5 most preferably 2 to 4. Other aspects of the invention will be described later with the preferred embodiments.

An electrodeionization apparatus according to another aspect of the invention has at least one anode, at least one cathode, ion-exchange membranes arranged between the anode and the cathode; concentrating compartments and at least one desalting compartment being defined by the ion-exchange membranes. The concentrated water flows through the concentrating compartments, feed water is fed into the desalting compartment, and product water is taken out from the desalting compartment. The concentrating compartment is divided into a plurality of concentrated water flowing sections by a partition extending along a direction crossing to the flowing direction in the desalting compartment. The concentrated water flows in the concentrated water flowing sections along a direction crossing the flow direction in the desalting compartment.

In the electrodeionization apparatus according to the above described aspect, the number of the concentrated water flowing sections is n which is an integer of at least 2, so that first through n-th concentrated water flowing sections are provided along the flow direction of water in the desalting compartment. A part of the concentrated water flowing out said first concentrated water flowing section is discharged and the remainder of the concentrated water is circulated to the first concentrated water flowing section. A part of concentrated water flowing out the k-th concentrated water flowing section, wherein $2 \leq k \leq n$, is supplied to the (k−1)-th flowing section just ahead of the k-th flowing section and the remainder of said concentrated water is circulated to the k-th concentrated water flowing section. A part of the product water is supplied to the concentrated water flowing section which is located at the most downstream side.

An electrodeionization system according to still another aspect of the invention has a plurality of electrodeionization apparatuses, and the number of the plurality of electrodeionization apparatuses is n which is an integer of at least 2. Water to be deionized flows from the first electrodeionization apparatus toward the n-th electrodeionization apparatus in series, and product water is taken out of the n-th electrodeionization apparatus. Each of the electrodeionization apparatus has at least one anode, at least one cathode, ion-exchange membranes arranged between the anode and the cathode; concentrating compartments and at least one desalting compartment being defined by said ion-exchange membranes. The concentrated water flows through the concentrating compartments, feed water is fed into the desalting compartment, and product water is taken out from the desalting compartment. The system has a flow line for supplying a part of said product water to the concentrating compartment of the n-th electrodeionization apparatus. The system has a flow line for discharging a part of concentrated water flowing out of the concentrating compartment of the first electrodeionization apparatus and circulating the reminder of the concentrated water into the concentrating compartment of the first electrodeionization apparatus. The system further has a flow line for supplying a part of concentrated water flowing out of the concentrating compartment of the k-th electrodeionization apparatus, wherein $2 \leq k \leq n$, to the concentrating compartment of the (k−1)-th electrodeionization apparatus and circulating the remainder of the concentrated water into the concentrating compartment of the k-th electrodeionization apparatus.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3b is a schematic diagram of the apparatus of FIG. 3a.

DETAILED DESCRIPTION OF THE INVENTION

The preferred embodiments and examples are described hereinafter, but the invention is not limitative thereto.

Figure 1:
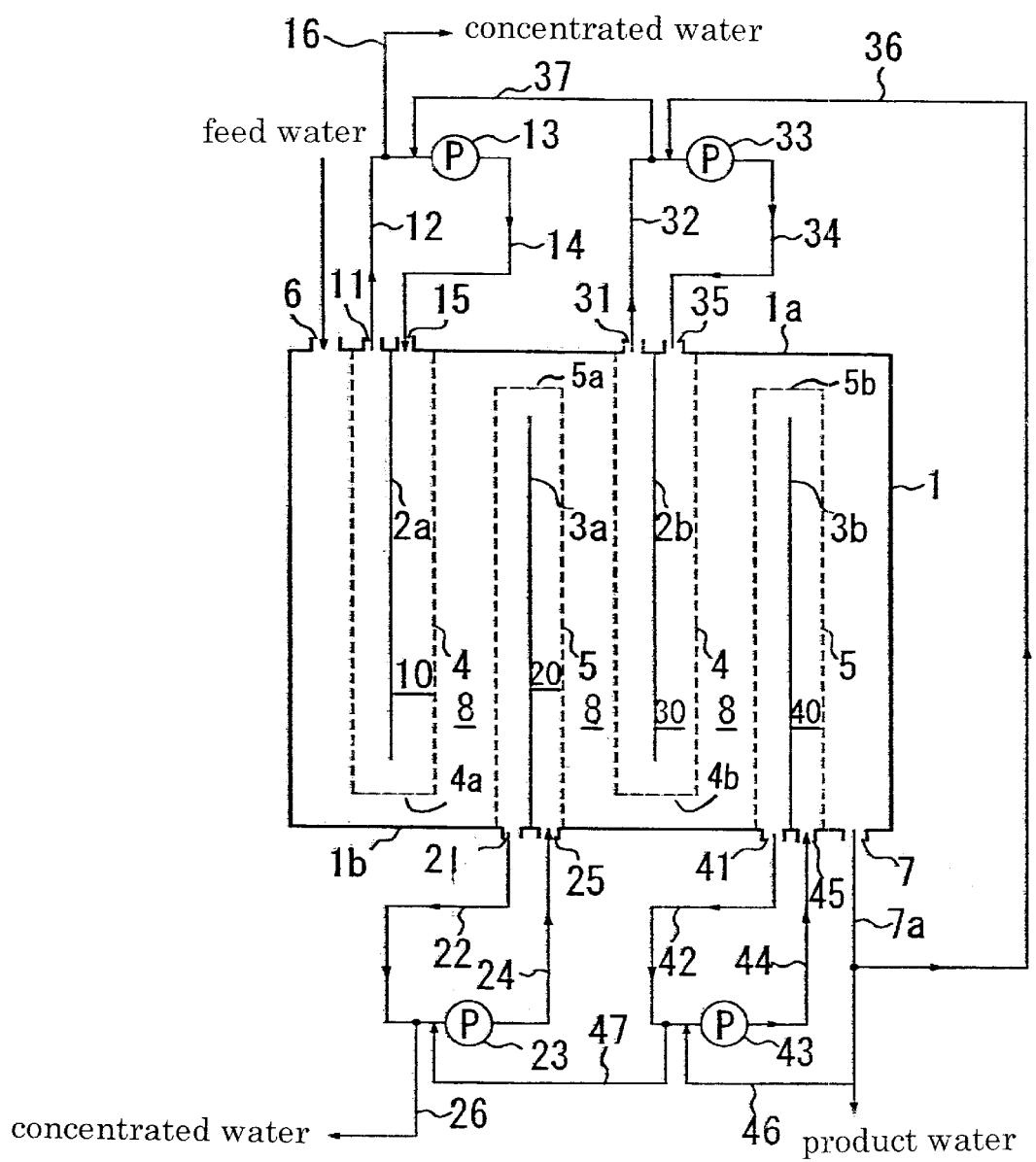
FIG. 1 is a schematic sectional view showing an electrodeionization apparatus according to an embodiment of the present invention.

FIG. 1 is a schematic sectional top view showing an electrodeionization apparatus according to a first embodiment of the present invention. In a casing 1 of the apparatus, anodes 2a, 2b and cathodes 3a, 3b, each preferably having a shape of a plate, are alternately arranged substantially parallel to each other. In this embodiment, anodes 2a, 2b are supported by one side wall 1a of casing 1 such that the ends of anodes 2a, 2b are spaced apart from the other side wall 1b. Cathodes 3a, 3b are supported by the other side wall 1b of casing 1 such that the ends of cathodes 3a, 3b are spaced apart from the one side wall 1a.

Each of anodes 2a, 2b are surrounded by an anion-exchange membrane 4 so that a first concentrating compartment 10 is defined by anion-exchange membrane 4 surrounding anode 2a, and a third concentrating compartment 30 is defined by anion-exchange membrane 4 surrounding anode 2b. Each of cathodes 3a, 3b is surrounded by a cation-exchange membrane 5 so that a second concentrating compartment 20 is defined by cation-exchange membrane 5 surrounding cathode 3a, and a fourth concentrating compartment 40 is defined by cation-exchange membrane 5 surrounding cathode 3b.

Casing 1 is provided with inlets 15, 35 and outlets 11, 31 such that concentrated water is introduced into a space at one side of each anode 2a, 2b in each concentrating compartment 10, 30 and is discharged from the other side.

Casing 1 is provided with inlets 25, 45 and outlets 21, 41 such that concentrated water is introduced into a space at one side of each cathode 3a, 3b in each concentrating compartment 20, 40 and is discharged from the other side.

Casing 1 is further provided with an inlet 6, for introducing feed water at a left side (as shown in FIG. 1), and with an outlet 7, for discharging deionized product water at a right side (as shown in FIG. 1). Product water is removed through a pipe 7a connected to outlet 7.

A desalting compartment 8, in which water to be treated flows, is defined between anion-exchange membranes 4 and cation-exchange membranes 5 in casing 1. Desalting compartment 8 is packed with an ion exchanger such as ion exchange resin. The concentrating compartments may be packed with an ion exchanger.

For circulating concentrated water through concentrating compartments 10, 20, 30, and 40, outlet 11 and inlet 15 are connected to each other via a pipe 12, a pump 13, and a pipe 14. Outlet 21 and inlet 25 are connected to each other by a pipe 22, a pump 23, and a pipe 24. Outlet 31 and inlet 35 are connected to each other by a pipe 32, a pump 33, and a pipe 34. Outlet 41 and the inlet 45 are connected to each other by a pipe 42, a pump 43, and a pipe 44.

For adding product water supplementary into the circulated concentrated water in concentrating compartments 30, 40 located near product water outlet 7, pipes 36, 46, as branches of pipe 7a, are connected to pipes 32, 42, respectively.

For supplying a part of circulated concentrated water of concentrating compartment 30, flowing through pipe 32 into concentrating compartment 10, pipe 32 is connected to pipe 12 through a pipe 37. For supplying a part of circulated concentrated water of concentrating compartment 40, flowing through pipe 42 into concentrating compartment 20, pipe 42 is connected to pipe 22 through a pipe 47.

Pipes 12, 22 are provided, as their branches, with pipes 16, 26, respectively, for discharging concentrated water.

The feed water to be treated is fed through inlet 6 into desalting compartment 8, flows around end 4a of anion-exchange membrane 4 surrounding anode 2a, enters into the portion defined between anion-exchange membrane 4 and cation-exchange membrane 5, and flows around end 5a of cation-exchange membrane 5, surrounding cathode 3a. Then, the water to be treated further flows around ends 4b, 5b of ion-exchange membranes 4, 5, surrounding anode 2b, and cathode 3b, in order, and then flows out through product water outlet 7.

During treatment, the water flowing in desalting compartment 8 in this way, anions and cations contained in the water to be treated permeate anion-exchange membranes 4 and cation-exchange membranes 5, respectively, so as to enter into the first through fourth concentrating compartments 10, 20, 30, and 40. Concentrated water flows in concentrating compartments 10, 20, 30, and 40. The ions, i.e. anions and cations, enter into the concentrated water in the respective concentrating compartments and are finally discharged from pipes 16, 26 through pipes 12, 22 connected to the concentrating compartments 10, 20, respectively.

The concentrated water flowing out of concentrating compartment outlet 41 of cathodic concentrating compartment 40 circulates through pipe 42, pump 43, and pipe 44. During flowing operation, a part of product water is supplied to pipe 42 from pipes 7a and 46. A part of the concentrated water in pipe 42 flows into pipe 22 connected to concentrating compartment 20 via pipe 47. While the concentrated water taken out of concentrated water outlet 21 of cathodic concentrating compartment 20 circulates through pipe 22, pump 23, and pipe 24, a part of the circulating concentrated water is discharged from pipe 26, and a part of the concentrated water in circulating pipe 42 enters into pipe 22 through pipe 47.

While the concentrated water taken out of concentrated water outlet 31 of anodic concentrating compartment 30 circulates through pipe 32, pump 33, and pipe 34, a part of the product water is supplied to pipe 32 from pipes 7a and 36. A part of concentrated water in the pipe 32 flows into pipe 12, connected to concentrating compartment 10 via pipe 37. While the concentrated water taken out of concentrated water outlet 11 of anodic concentrating compartment 10 circulates through pipe 12, pump 13, and pipe 14, a part of circulating concentrated water is discharged from pipe 16, and a part of the concentrated water in circulating pipe 32 enters into pipe 12 through pipe 37.

As described above, since the product water is introduced from pipe 7a into concentrating compartments 30, 40 near the product water outlet, the silica concentrations in concentrating compartments 30, 40 are reduced so as to be less than 1000 times as great as that of the product water. Therefore, the concentration gradients from concentrating compartments 30, 40 to desalting compartment 8 are also reduced, thus restricting the diffusion of silica from concentrating compartments 30, 40 to desalting compartment 8. As a result, final product water containing extremely low silica concentration obtained from pipe 7a.

The apparatus shown in FIG. 1 has two anodic concentrating compartments and two cathodic concentrating compartments, but it may employ more compartments.

Figure 2:
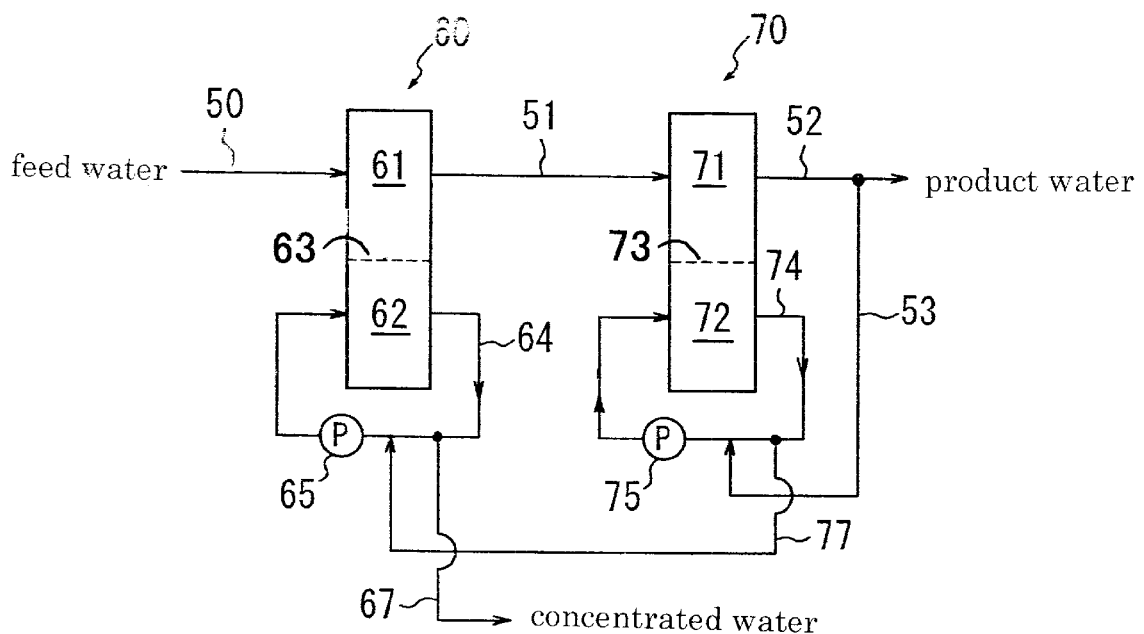
FIG. 2 is a schematic diagram showing flow of water in an electrodeionization system according to another embodiment of the present invention.

FIG. 2 is a schematic diagram showing flow of water in the electrodeionization system according to another embodiment of the present invention. This system comprises two electrodeionization apparatuses 60, 70.

Electrodeionization apparatuses 60, 70 have desalting compartments 61, 71 and concentrating compartments 62, 72, defined by ion-exchange membranes 63, 73, respectively. Feed water, to be treated, is introduced into desalting compartment 61 of electrodeionization apparatus 60 through a pipe 50 and is desalted or treated. After that, the treated water is introduced into desalting compartment 71 of electrodeionization apparatus 70 through a pipe 51 and is again desalted or treated. Final product water is taken out from desalting compartment 71 through a pipe 52. A pipe 53 is branched from pipe 52, providing a part of the product water into a pipe 74 for circulating concentrated water.

Electrodeionization apparatus 60 is provided at its concentrating compartment 62 with a concentrated water outlet and a concentrated water inlet which are connected by a pipe 64 for circulation. A pump 65 is disposed on the path of pipe 64. Electrodeionization apparatus 70 is provided at its concentrating compartment 72 with a concentrated water outlet and a concentrated water inlet which are connected by pipe 74 for circulation. A pump 75 is disposed on the path of pipe 74. A part of final product water is introduced to pipe 74 of electrodeionization apparatus 70 of downstream side through pipe 53 branched from pipe 52. A part of concentrated water in pipe 74, connected to concentrating compartment 72, is introduced into pipe 64 of electrodeionization apparatus 60 through a pipe 77. A part of concentrated water in pipe 64, connected to concentrating compartment 62, is discharged through pipe 67.

Referring to the electrodeionization system shown in FIG. 2, while the concentrated water in concentrating compartment 72 is circulated through pipe 74, a part of final product water is supplied to pipe 74 and 53. Therefore, the silica concentration of concentrating compartment 72 is reduced to be less than 1000 times as great as that of the product water.

This results in a reduction in the concentration gradients from concentrating compartment 72 to desalting compartment 71, thus restricting the diffusion of silica from concentrating compartment 72 to desalting compartment 71. As a result, final product water containing extremely low silica concentration is obtained from pipe 52.

Each apparatus shown in FIGS. 1 and 2 is operated under the following conditions:

feed water containing a silica concentration 200 ppb;

the flow rate of the feed water to be supplied to desalting compartment 8 or 61 being 1.1 t/h (tons per hour);

the amount of concentrated water to be circulated in each concentrating compartment 10, 20, 30, 40, 62, 72 being 1 t/h;

the amount of concentrated water to be taken out from the concentrated water circulating line being 0.1 t/h; and the amount of product water to be introduced to concentrated water circulating pipe 32, 42, 74 being 0.1 t/h.

Under the above conditions, the silica concentration in concentrating compartment 30, 40, 72 is approximately 40 ppb and silica concentration in concentrating compartment 10, 20, 62 is approximately 2000 ppb. That is, the concentration gradients from concentrating compartment 30, 40, 72 to the desalting compartment is significantly decreased. Thus, the silica concentration of final product water becomes less than 0.1 ppb.

The apparatus shown in FIG. 2 employs two electrodeionizationes, but it may employ more electrodeionizationes connected in series.

Figure 3A:
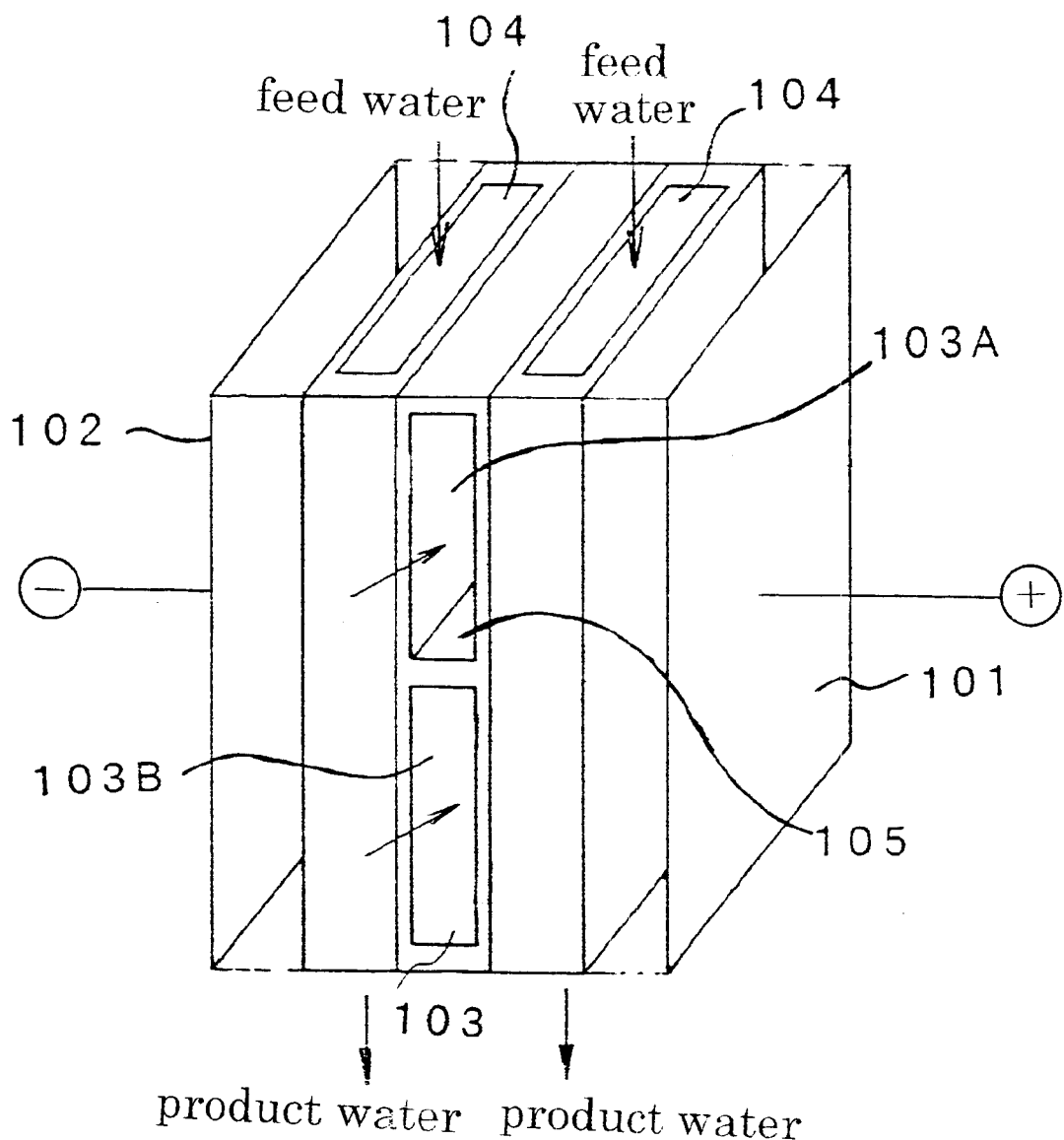
FIG. 3a is a perspective view schematically showing an electrodeionization apparatus according to another embodiment of the present invention.

FIG. 3a is a perspective view schematically showing an electrodeionization apparatus according to another embodiment, FIG. 3b is a schematic diagram showing the flow of water in this apparatus.

Referring to FIGS. 3a and 3b, an electrodeionization apparatus has an anode 101 and a cathode 102. Cation-exchange membranes and anion-exchange membranes are alternately arranged between anode 101 and cathode 102 to define a concentrating compartment 103 and desalting compartments 104.

In this embodiment, concentrating compartment 103 is arranged at the center between anode 101 and cathode 102. Desalting compartments 104 are arranged on the anode side and the cathode side of concentrating compartment 103, respectively. Feed water, to be treated, is supplied to desalting compartments 104 through a pipe 106. After the feed water is desalted, product water is taken out through a pipe 110.

Concentrating compartment 103 is divided into two concentrated water flowing sections 103A, 103B by a partition 105. The flowing direction of concentrated water in each concentrated water flowing section 103A, 103B crosses, preferably substantially perpendicularly to, the flowing direction in desalting compartments 104. The term "substantially perpendicular" is defined to mean "at an angle between about 80–100°". Each desalting compartment 104 has an inlet at the top and an outlet at the bottom (as shown in FIG. 3a) so that water to be treated flows downwardly in a vertical direction.

Concentrating compartment 103 is provided with partition 105. Partition 105, extending in a direction substantially perpendicular to the vertical direction as the flowing direction in desalting compartments 104, forms concentrated water flowing section 103A and concentrated water flowing section 103B on the upper and lower sides with reference to partition 105, respectively, in concentrating compartment 103.

Hereinafter, concentrated water flowing section 103A, near the inlets of desalting compartments 104 is referred to as "upstream concentrating compartment 103A". Likewise, concentrated water flowing section 103B, near the outlets of desalting compartments 104, is referred to as "downstream concentrating compartment 103B".

The concentrated water outlet and the concentrated water inlet of upstream concentrating compartment 103A are connected through a circulating pipe 107A, a pump 108A, and a pipe 109A. The concentrated water outlet and the concentrated water inlet of downstream concentrating compartment 103B are connected through a circulating pipe 107B, a pump 108B, and a pipe 109B. The concentrated water in downstream concentrating compartment 103B circulates through a circulating pipe 107B, a pump 108B, and a pipe 109B, in this order. A part of final product water is introduced to concentrated water flowing pipe 109B, from a product water pipe 110, through a supply water pipe 111 branched from product water pipe 110. A part of the concentrated water flowing through pipe 107B, from downstream concentrating compartment 103B, is introduced into pipe 107A to upstream concentrating compartment 103A through a pipe 112. A part of the concentrated water flowing out from upstream concentrating compartment 103A is discharged through a pipe 113.

Since a part of final product water is introduced to the concentrated water circulating through downstream concentrating compartment 103B and pipes 107B, 109B, the silica concentration of concentrated water in downstream concentrating compartment 103B is reduced to less than 1000 times as great as that of the product water. Thus, the concentration gradient from concentrating compartment 103B to desalting compartment 104 is also reduced. Therefore, the diffusion of silica from concentrating compartment 103B to desalting compartments 104 is restricted. As a result, final product water containing extremely low silica concentration is obtained from pipe 110.

The present invention will be described in further detail with reference to the following examples and comparative examples.

EXAMPLE 1

Experiment conditions were as follows. Feed water to be supplied was service water which had been first filtered with activated carbon, deionized by reverse osmosis, and further filtered with deaerating membranes. The feed water contained a silica concentration of 400 ppb. The water was supplied in the method of present invention shown in FIG. 2. Desalting compartments of an electrodeionization apparatus were filled with ion exchange resins consisting of a mixture of ion exchange resin "650C" manufactured by Dow Chemical Co., and ion exchange resin "SSA10" manufactured by Mitsubishi Chemical Corporation, in a ratio of 4:6. Ion-exchange membranes were CMB and AHA manufactured by Tokuyama Corporation. As for a downstream electrodeionization apparatus, a concentrating compartment was filled with the same ion exchange resins as mentioned above. The size of the desalting compartment was 187 mm in width×795 mm in height×2.5 mm in thickness. One electrodeionization apparatus has three desalting compartments. The feed water was supplied at a flow rate of about 80 l/h (liters per hour). The overall product water recovery from each apparatus was 90%. The voltage was 21V.

As for operation under these conditions, the silica concentration of concentrated water flowing out from the concentrating compartment of the downstream electrodeionization apparatus and the silica concentration of final product water were measured and the results are shown in Table 1.

COMPARATIVE EXAMPLE 1

An experiment was operated under the same conditions as Example 1 except that silica solution is added through an inlet for a concentrating compartment of a downstream electrodeionization apparatus to make the silica concentration to be 220 ppb. The silica concentration of final product water was measured and the results are shown in Table 1.

COMPARATIVE EXAMPLE 2

Figure 4:
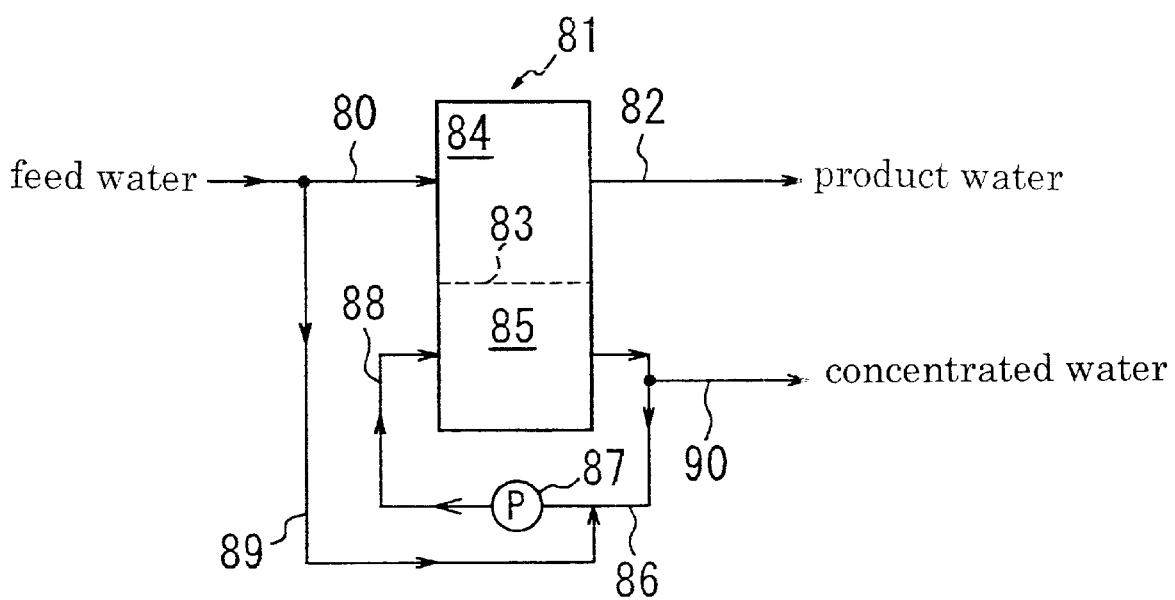
FIG. 4 is a schematic diagram of a comparative example.

An experiment was operated under the same conditions as Example 1 except using an apparatus shown in FIG. 4. The silica concentration of final product water was measured and the results are shown in Table 1.

In the apparatus shown in FIG. 4, feed water is supplied to a desalting compartment 84 of electrodeionization apparatus 81 through a pipe 80 and is taken out as product water through a pipe 82. Electrodeionization apparatus 81 is provided with and divided by an ion-exchange membrane 83 so as to form desalting compartment 84 and a concentrating compartment 85. The concentrated water outlet and the concentrated water inlet of concentrating compartment 85 are connected through a circulating pipe 86, a pump 87, and a pipe 88. Feed water is supplemented to pipe 86 through a pipe 89, branched from feed water supply pipe 80. A part of the concentrated water flowing through pipe 86, from concentrating compartment 85, is discharged through pipe 90.

TABLE 1

| | Silica concentration of concentrated water in downstream electrodeionization apparatus [ppb] | Silica concentration of product water [ppb] |
|---|---|---|
| Example 1 | 80 | <0.1 |
| Comparative Example 1 | 220 | 0.2 |
| Comparative Example 2 | 4000 | 3.8 |

EXAMPLE 2

The system shown in FIG. 2 was operated where the flow rate in the desalting compartment and the mixing ratio of the cation exchange resin and the anion exchange resin were the same as in Example 1. The desalting compartment has a conduit length of 3200 mm. As a result of operation, the concentrated water flowing out of outlet 41 had a silica concentration of 40 ppb, and the product water had a silica concentration of less than 0.1 ppb.

EXAMPLE 3

The system shown in FIG. 3 was operated where the flow rate in the desalting compartment and the mixing ratio of the cation exchange resin and the anion exchange resin are the same as in Example 1. The concentrated water flowing out of concentrating compartment 103B to line 107 had a silica concentration of 80 ppb. The product water had a silica concentration of less than 0.1 ppb.

As described above, the electrodeionization apparatus and its operating method produces deionized water containing extremely low silica concentration of 0.1 ppb or less.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of operating an electrodeionization apparatus, said electrodeionization apparatus comprising at least one anode, at least one cathode, and ion-exchange membranes which are arranged to form at least one concentrating compartment and at least one desalting compartment between the anode and the cathode, comprising:

introducing concentrated water into said concentrating compartment;

supplying feed water into said desalting compartment; and taking out product water from said desalting compartment; wherein concentrated water flowing out of said concentrating compartment has a concentration of silica less than 1000 times as great as that of the product water.

2. A method of operating an electrodeionization apparatus as claimed in claim 1, wherein said concentrated water flowing out of said concentrating compartment has a silica concentration of less than 100 ppb.

3. A method of operating an electrodeionization apparatus as claimed in claim 1, wherein:

a plurality concentrating compartments are provided along a flow direction of water in said desalting compartment; and said concentrated water flowing out of said concentrating compartment which is located at the most downstream side has a silica concentration less than 1000 times as great as that of the product water.

4. A method of operating an electrodeionization apparatus as claimed in claim 3, wherein:

the number of said plurality of concentrating compartments is n, wherein n is an integer of at least 2, so that a first through n-th concentrating compartments are provided along the flow direction of water in said desalting compartment;

a part of the concentrated water flowing out said first concentrating compartment is discharged and the remainder of the concentrated water is circulated to said first concentrating compartment;

a part of the concentrated water flowing out the k-th concentrating compartment, wherein $2 \leq k \leq n$, is supplied to the (k−1)-th compartment just ahead of the k-th compartment and the remainder of the concentrated water is circulated to the k-th concentrating compartment; and a part of the product water is supplied to the n-th concentrating compartment, which is located at the most downstream desalting compartment.

5. A method of operating an electrodeionization apparatus as claimed in claim 4, wherein n is an integer from 2 to 10.

6. A method of operating an electrodeionization apparatus as claimed in claim 4, wherein n is an integer from 2 to 5.

7. A method of operating an electrodeionization apparatus as claimed in claim 4, wherein n is an integer from 2 to 4.

8. A method of operating an electrodeionization apparatus as claimed in claim 4, wherein said desalting compartment is packed with an ion exchanger.

9. A method of operating an electrodeionization apparatus as claimed in claim 8, wherein said ion exchanger is at least one of ion exchange resin and ion exchange fiber.

10. A method of operating an electrodeionization apparatus as claimed in claim 1, wherein said concentrating compartment is packed with an ion exchanger.

11. A method of operating an electrodeionization apparatus as claimed in claim 1, wherein said concentrating compartment is packed with an activated carbon.

12. A method of operating an electrodeionization apparatus as claimed in claim 1, wherein the concentrated water flowing out of the concentrating compartment has a silica concentration less than 700 times as great as that of the product water.

13. A method of operating an electrodeionization apparatus as claimed in claim 1, wherein a plurality of the electrodeionization apparatuses are provided, whereby the water to be deionized flows through the electrodeionization apparatuses in series, and the concentrated water flowing out of the most downstream electrodeionization apparatus has a silica concentration less than 1000 times as great as that of the product water taken out of the most downstream electrodeionization apparatus.

14. A method of operating an electrodeionization apparatus as claimed in claim 13, wherein:
the number of said plurality of concentrating compartments is n, wherein n is an integer of at least 2, so that a first through n-th concentrating compartments are provided;
a part of the concentrated water flowing out said first concentrating compartment is discharged and the remainder of the concentrated water is circulated to said first concentrating compartment;
a part of the concentrated water flowing out the k-th concentrating compartment, wherein $2 \leq k \leq n$, is supplied to the (k−1)-th compartment just ahead of the k-th compartment and the remainder of the concentrated water is circulated to the k-th concentrating compartment; and
a part of the product water is supplied to the n-th concentrating compartment, which is located at the most downstream desalting compartment.

15. A method of operating an electrodeionization apparatus as claimed in claim 13, wherein n is 2.

16. A method of operating an electrodeionization apparatus as claimed in claim 1, wherein:
the cation-exchange membranes and the anion-exchange membranes are arranged alternatively between said anode and said cathode to form said concentrating compartment and said desalting compartment; and
said concentrating compartment is divided into a plurality of concentrated water flowing sections by a partition extending along a direction crossing to the flowing direction in said desalting compartment, whereby the concentrated water flows in said concentrated water flowing sections along the direction crossing the flow direction in said desalting compartment.

17. A method of operating an electrodeionization apparatus as claimed in claim 16, wherein:
the number of said plurality of concentrating compartments is n, wherein n is an integer of at least 2, so that a first through n-th concentrating compartments are provided along the flow direction of water in said desalting compartment;
a part of the concentrated water flowing out said first concentrating compartment is discharged and the remainder of the concentrated water is circulated to said first concentrating compartment;
a part of the concentrated water flowing out the k-th concentrating compartment, wherein $2 \leq k \leq n$, is supplied to the (k−1)-th compartment just ahead of the k-th compartment and the remainder of the concentrated water is circulated to the k-th concentrating compartment;
a part of the product water is supplied to the n-th concentrating compartment, which is located at the most downstream desalting compartment; and
wherein the concentrated water flowing out of the n-th compartment has a silica concentration of 1000 times as great as that of the product water.

18. An electrodeionization apparatus comprising:
at least one anode;
at least one cathode;
ion-exchange membranes arranged between said anode and said cathode;
concentrating compartments and at least one desalting compartment being defined by said ion-exchange membranes, whereby concentrated water flows through said concentrating compartments, feed water is fed into said desalting compartment, and product water is taken out from said desalting compartment;
said concentrating compartments consisting of first through n-th concentrating compartments from the most upstream side to the most downstream side with respect to said desalting compartment; and
a flow line for supplying a part of said product water to said n-th concentrating compartment.

19. An electrodeionization apparatus as claimed in claim 18, further comprising:
a flow line for discharging a part of concentrated water flowing out of said first concentrating compartment and circulating the reminder of said concentrated water into said first concentrating compartment; and
a flow line for supplying a part of concentrated water flowing out of the k-th concentrating compartment, wherein $2 \leq k \leq n$, to the (k−1)-th concentrating compartment and circulating the remainder of the concentrated water into the k-th concentrating compartment.

20. An electrodeionization system having a plurality of electrodeionization apparatuses, the number of said plurality of electrodeionization apparatuses being n, n being an integer of at least 2, whereby water to be deionized flows from said first electrodeionization apparatus toward said n-th electrodeionization apparatus in series, and product water is taken out of the n-th electrodeionization apparatus, each of said electrodeionization apparatus comprising:
at least one anode,
at least one cathode,
ion-exchange membranes arranged between said anode and said cathode;
concentrating compartments and at least one desalting compartment being defined by said ion-exchange membranes, whereby concentrated water flows through said concentrating compartments, feed water is fed into said desalting compartment, and product water is taken out from said desalting compartment;
a flow line for supplying a part of said product water to the concentrating compartment of the n-th electrodeionization apparatus;
a flow line for discharging a part of concentrated water flowing out of said concentrating compartment of said first electrodeionization apparatus and circulating the reminder of the concentrated water into said concentrating compartment of said first electrodeionization apparatus; and
a flow line for supplying a part of concentrated water flowing out of said concentrating compartment of the k-th electrodeionization apparatus, wherein $2 \leq k \leq n$, to the concentrating compartment of the (k−1)-th electrodeionization apparatus and circulating the remainder of said concentrated water into said concentrating compartment of said k-th electrodeionization apparatus.

21. An electrodeionization apparatus comprising:

at least one anode, at least one cathode, ion-exchange membranes arranged between said anode and said cathode;

concentrating compartments and at least one desalting compartment being defined by said ion-exchange membranes, whereby concentrated water flows through said concentrating compartments, feed water is fed into said desalting compartment, and product water is taken out from said desalting compartment;

said concentrating compartment being divided into a plurality of concentrated water flowing sections by a partition extending along a direction crossing to the flowing direction in said desalting compartment, whereby said concentrated water flows in said concentrated water flowing sections along a direction crossing the flow direction in said desalting compartment.

22. An electrodeionization apparatus as claimed in claim 21, wherein:

the number of the concentrated water flowing sections is n, n being an integer of at least 2, so that first through n-th concentrated water flowing sections are provided along the flow direction of water in said desalting compartment;

a part of the concentrated water flowing out said first concentrated water flowing section is discharged and the remainder of the concentrated water is circulated to said first concentrated water flowing section;

a part of concentrated water flowing out the k-th concentrated water flowing section, wherein $2 \leq k \leq n$, is supplied to the (k−1)-th flowing section just ahead of the k-th flowing section and the remainder of said concentrated water is circulated to the k-th concentrated water flowing section; and a part of said product water is supplied to said concentrated water flowing section which is located at the most downstream side.

* * * * *